July 2, 1935.  A. DISTELI  2,007,017

MICROOSCILLOGRAPH

Filed Feb. 10, 1933

INVENTOR
Alfred Disteli
BY
George C. Heinrichs
ATTORNEY

Patented July 2, 1935

2,007,017

UNITED STATES PATENT OFFICE 2,007,017

MICROOSCILLOGRAPH

Alfred Disteli, Olten, Switzerland, assignor to Ernst Leitz, Optische Werke, G. m. b. H., Wetzlar, Germany Application February 10, 1933, Serial No. 656,101
In Switzerland May 30, 1932

1 Claim. (Cl. 171—95)

This invention relates to improvements in means for optically enlarging the oscillations in an oscillograph so as to make the same plainly visible to the eye of the observer.

It is the principal object of my invention to provide a micro-oscillograph, i. e. a device combining an oscillograph with a microscope without mirror, which is so interposed between a light condenser and a microscopic lens combination, that even the most feeble or the weakest oscillations in the oscillograph are optically enlarged and thus made visible and suitable for their observation.

It is immaterial from what source the oscillations may be derived, they are made clearly visible optically without necessitating any changes in the electrical apparatus.

These and other objects and advantages of my invention will become more clearly known as the description thereof proceeds and will then be specifically defined in the appended claim.

In the accompanying drawing forming a material part of this disclosure:

Figure 1:
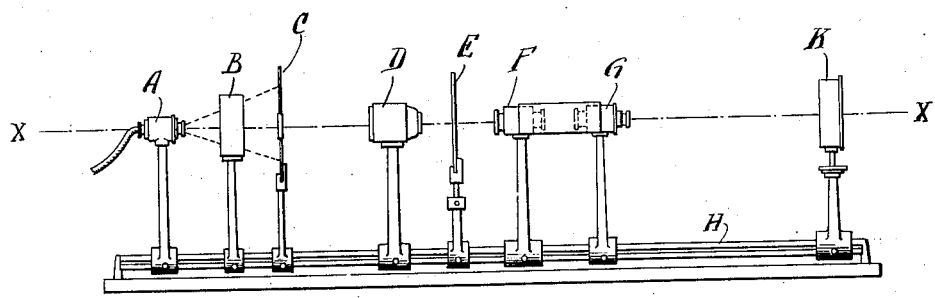
Fig. 1 illustrates an optical bench with a microoscillograph constructed according to my invention.

As shown in Figure 1 a source of light A directs its bunch of rays across the cooler B and the shutter C to the condenser D and an electro-oscillograph E not having any mirror. The electro-oscillograph E is arranged between the condenser D and a microscopic lens combination composed of the objective F and ocular G.

The bunch of rays is directed onto the revolving mirrorscope K of known construction and onto a projection screen in front of said mirrorscope (not shown). All these parts are arranged on the bench H adjustable to one another, they are located in the optical axis $x$—$x$ of the system.

By means of this arrangement the oscillations of the oscillograph E which may be extremely small, are optically enlarged and are reflected by the revolving mirror K, and made accurately and clearly visible.

Figure 2:
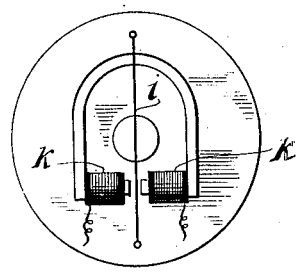
Fig. 2 illustrates diagrammatically a hair oscillograph.

In Figure 2 I have shown diagrammatically a hair oscillograph, the illustrated hair element $i$ of which is suspended to oscillate between two electro-magnets $k$ and furnishes negative or dark curve pictures.

Figure 3:
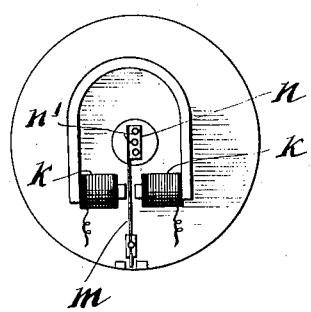
Fig. 3 illustrates a form of my invenion using a lamella.

In the modification illustrated in Figure 3 a shutter $n$ having three differently calibrated openings $n'$ is arranged on a lamella $m$ which is movably arranged between the two electromagnets $k$. Thus selectively one or the other of these openings may be brought for illumination into registry with the optical axis $x$—$x$ for the production of positive or light curve pictures. If desired these openings can be equipped with small lenses.

Figure 4:
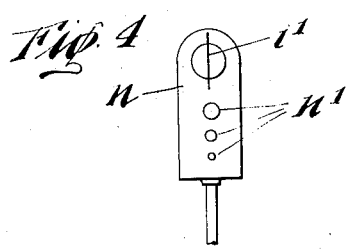
Fig. 4 illustrates another form of my invention using a perforated shutter.

In the form of my invention illustrated in Figure 4, the shutter $n$ has openings $n'$ and constitutes simultaneously the holder for the hair element $i'$ so that selectively one or the other of the openings $n'$ or the hair element may be used, thus allowing the production of positive and light, or negative or dark curve pictures.

In use the oscillations of the oscillograph on the optical bench are projected in form of light curves upon a screen. The microscopic arrangement will permit of any desired adjustment of the size and sharpness of the curves.

In consequence of the optical enlargement of the oscillations an oscillograph with minimum deviations may be used and mirror and articulations may be omitted with the oscillations while all lever constructions are omitted which tend to make inaccurate features of the curve picture appear enlarged, while the arrangement of the elements is simple and durable and all elements used may readily be exchanged.

It will be understood that I have disclosed the preferred forms of my invention as a few examples only of the many possible ways to practically construct the same, and that I may make such changes therein as come within the scope of the appended claims without departure from the spirit of my invention and the principles involved.

Having thus described my invention what I claim as new and desire to secure by Letters Patent is:

In a micro-oscillograph including a light, a cooler through which the light is directed to a diaphragm and to a condenser, to an electric oscillograph and through an optical system including an objective and eyepiece, onto a revolving microscope, all of said elements being adjustably arranged on a bench, said electric oscillograph member having an opening concentric with the optical axis of the elements on said bench two electromagnets thereon, and a flexible rod arranged between said two electromagnets, a plate near the upper end of said rod within the opening in said oscillograph member, said plate having apertures of different diameters, and lenses in said apertures, said member, when bodily raised and lowered, being adapted to bring any one of its calibrated apertures into registry with the optical axis of said elements, for the production of light curve pictures by said microscope.

ALFRED DISTELI.